US 6,648,704 B1
United States Patent
Fontanille

(10) Patent No.: US 6,648,704 B1
(45) Date of Patent: Nov. 18, 2003

(54) HOUSING FOR ANGLE GEARBOX FOR A BOAT PROPULSION MOTOR

(75) Inventor: Guy Fontanille, Les Adrets de l'Esterel (FR)

(73) Assignee: Max Power, Mandelieu la Napoule (FR)

( * ) Notice: Subject to any disclaimer, the term of this patent is extended or adjusted under 35 U.S.C. 154(b) by 0 days.

(21) Appl. No.: 10/070,483

(22) PCT Filed: Sep. 4, 2000

(86) PCT No.: PCT/FR00/02437

§ 371 (c)(1),
(2), (4) Date: Apr. 25, 2002

(87) PCT Pub. No.: WO01/18431

PCT Pub. Date: Mar. 15, 2001

(30) Foreign Application Priority Data

Sep. 7, 1999 (FR) .............................................. 99 11325

(51) Int. Cl.$^7$ .............................................. B63H 23/00
(52) U.S. Cl. ......................................... 440/75; 440/113
(58) Field of Search .................................... 440/113, 75

(56) References Cited

U.S. PATENT DOCUMENTS

| 2,039,535 A | 5/1936 | Irgens |
| 2,089,366 A | 8/1937 | Hansen |
| 2,545,502 A | 3/1951 | Troester |
| 3,939,795 A | 2/1976 | Rocka |
| 3,946,698 A | 3/1976 | LaFollette et al. |
| 5,505,101 A | 4/1996 | Curtis ........................ 74/417 |
| 5,642,991 A | 7/1997 | Singleterry et al. ......... 418/104 |
| 5,908,072 A | 6/1999 | Hawkins ................. 166/241.6 |

FOREIGN PATENT DOCUMENTS

| EP | 0 177 001 A2 | 9/1985 |
| EP | 0 394 029 A3 | 4/1990 |
| EP | 0 394 029 A2 | 4/1990 |
| FR | 2517018 | 11/1982 |

OTHER PUBLICATIONS

International Preliminary Examination Report, in French, dated Feb. 5, 2001.
Notification of Change of Registration, Form PCT/IB/306, in French, dated Mar. 12, 2002.
English Translation of International Preliminary Examination Report for PCT/FR00/02437.

*Primary Examiner*—Jesus D. Sotelo
(74) *Attorney, Agent, or Firm*—Cohen, Pontani, Lieberman & Pavane

(57) ABSTRACT

The invention concerns a housing (1) for an angle gear box device of a boat propulsion motor designed to be immersed and to contain an angle gear box device comprising: two shafts rotating relatively to two perpendicular axes (XX', YY') whereof the first shaft (Y, Y') is driven in rotation by said motor and a second shaft (XX') drives at least a propeller in rotation; and mechanical elements comprising gears and roller bearings enabling the transmission of rotation of said first shaft to said second shaft. The invention is characterised in that it comprises two assembled matching half-shells (2) produced from a reinforced synthetic thermoplastic polymer material co-operating with each other along a joint plane defined by said axes (XX' and YY') of rotation of said rotary shafts and having each; a recessed zone housing said angle gear box device in said joint plane, and a planar support surface (4a, 4b, 4c) external to said recessed zone and acting as support on the matching half-shell.

13 Claims, 3 Drawing Sheets

HOUSING FOR ANGLE GEARBOX FOR A BOAT PROPULSION MOTOR

This invention concerns a propulsion motor angle gearbox device housing for floating or submersible craft, more particularly motors mounted on boat or ship bows and poops.

More specifically, the invention concerns a housing or box designed to protect an angle gearbox of the type comprising:

two shafts rotating respectively with respect to two perpendicular rotating shafts, of which a first shaft is driven in rotation by a motor and a second shaft drives at least one propeller in rotation;

as well as mechanical parts such as gears comprising toothed gears and ball-bearings for transmitting rotation from said first shaft to said second shaft.

This type of device is used more particularly in retracing or tilting propulsion devices for use on floating units, in particular for leisure activities in which the propulsion device must be installed well forward in the hull of the boat. In patent WO 97/20733, propulsion units of this type are described, in particular lateral or longitudinal propulsion motors in which the propulsion motor is associated with a guiding arm, the upper part of which includes a motor, while the guiding arm encloses a rotating shaft connected to the motor and driving, at the other end, an angle gearbox device to ensure rotation of the shaft on which a propeller is mounted.

In prior embodiments of the angle gearbox device housing in the maritime area, or in other industrial areas, they are always made of a metallic material with a main part protecting the angle gearbox device comprising a single hollow casting within which are inserted blind aid shafts and said mechanical devices ensuring the angle drive to ensure protection that offers sufficient mechanical strength to take up the considerable forces of mechanical stress induced by the thrust of the shaft supporting said propulsion propeller and to which the housing is exposed when the angle gearbox device is in action. In the case of an immersed device, manufacturers generally use heavy and costly materials such as bronze for the additional requirements of resistance to corrosion.

In addition, this hollow protection metal casting requires precision machining that is lengthy and difficult to obtain.

Finally, because of its structure in a single hollow part of cast metal, the assembly of the various mechanical parts of the angle gearbox device in the housing is lengthy and difficult because it is carried out blind. The fitting of the complete device, in particular to ensure total perpendicularity of the rotating shaft axes in said part is difficult and cannot be inspected when the angle gearbox device is assembled inside the housing. In addition, it is necessary to carry out the full assembly of the angle gearbox device in the housing and assemble the housing with the other mechanical parts assembled at the output of the housing in line with the two shafts to make sure that the angle gearbox device is properly fitted in the housing and verify its alignment according to the adjustment tolerances of the various other components at the output of the housing in line with the two shafts.

These difficulties of alignment and adjustment are all the more evident in that the hollow metal casting is difficult to reproduce uniformly in production because of the amount of precision machining involved in its manufacture.

In addition, the housing consists of an assembly with three other fitted metal parts which must also be machined accurately. These fitted parts ensure the closing of the orifices in said main hollow part through which the various main mechanical components of the angle gearbox device are inserted into said main hollow part. The fitted parts cosign the insertion orifices of the angle gearbox device in said housing are attached to said main metal hollow casting according to a junction plane perpendicular to the rotating axes and, more particularly perpendicular to the propulsion shaft supporting the propeller. Thus, the thrust forces of the shaft supporting the propeller must be taken up by the means of attaching the fitted parts to said main hollow casting at the output orifice of the propulsion shaft supporting the propeller.

In all, because of the structure of the housings in prior embodiments, the machining and assembly of said housings and component parts are particularly lengthy and costly.

Accordingly, in side or longitudinal propulsion motors of the type described in Wo 97/20733, the cost of the housing and the assembly of the mechanical parts of the angle gearbox device it contains represent approximately two-thirds of the cost of the propeller motor.

In U.S. Pat. No. 3,946,698 and FR 2 517 018, there are known angle gearbox housings constructed from two half-shells of metallic alloy. In FR 2 517 018, the housing is no longer designed to be immersed in a marine environment for the propulsion of a propeller motor on a floating or submersible craft. In U.S. Pat. No. 3,946,698, the housing comprises two superimposed parts enclosing two angle gearbox devices in such a way that the rotating shaft connected to the motor is parallel to the rotating shaft connected to the propeller.

The problem of this invention is therefore of obtaining an angle gearbox drive device and ball-bearing housing for a floating or submersible craft propulsion motor wherein said angle gearbox device includes a rotating shaft connected to the motor and a perpendicular shaft connected to the propeller, and said housing sufficient mechanical strength to take up the mechanical thrust stresses transmitted by said device and taken up by the housing while overcoming the drawbacks of assembly and cost of prior metallic housings constructed of machined metal parts as described previously.

Another problem is of supplying a housing for use in a marine environment offering mechanical and watertightness stability properties, but also of hydraulic capability, in particular with a small volume and overall size, suitable for the conditions of use in immersion at a depth of at least 1 meter, and preferably at least 3 meters, with tightness designed more specifically to provide protection against the extended effects of immersion under pressure.

The research of the inventor in choosing the structure of the parts that may form the housing main protection body have resulted obtaining a solution to the problems raised with a housing whose main receptacle body for the angle gearbox device comprises several parts of a reinforced synthetic material cooperating to an appropriate junction plane.

More specifically, this invention supplies a propulsion motor angle gearbox device housing for boats intended to be immersed and to contain an angle gearbox device comprising:

two shafts rotating with respect to two perpendicular shafts, the first of which is driven in rotation by said motor, and a second shaft driving at least one propeller in rotation;

as well as the mechanical parts comprising the gears and ball-bearings for transmitting the rotation of said first shaft to said second shaft, characterized in that it comprises two assembled complementary half-shells made of a reinforced thermoplastic polymer synthetic material cooperating with one another according to a junction plane defined by said axes of rotation of said rotating shafts, and each offering in said junction plane:

a hollow area forming a receptacle for said angle gearbox device, and a plane bearing surface outside said hollow area and serving as a support on the complementary shell.

Preferably, the two half-shells comprise, at their ends, half-sleeves in such a way that once the half-shells are assembled, they define a housing comprising;

an upper tubular sleeve through which said first shaft protrudes, and at least one side tubular sleeve comprising at least one internal annular opening designed to receive said bearings, through which side sleeve a said second shaft penetrates, and stable and sealed means of assembly of the two half-shells including tubular-shaped collars fitted around said tubular sleeves, which collars are preferably made of stainless steel.

Said collars provide a stable and sealed mechanical link between the two half-shells in a particularly advantageous manner because they cover the areas of the housing containing the bearings and/or that cooperate with the propellers, or an opening in a support element ensuring an interconnecting interface between the housing and the motor, and therefore exposed to considerable mechanical forces liable to cause mechanical breakage and/or tightness faults. Said collars, in particular, dispense with recourse to having on the surface of said sleeves, bosses through which holes are provided to permit an attachment of two half-shells by threaded device. Said bosses would be disadvantageous from the hydraulic and hydrodynamic standpoints regarding the outside profile of the housing, and would tend to increase the volume of said housing, which it is desirable to avoid in the immersed medium.

In addition, because at least one of the said sleeves is housed with a propeller hub, these bosses would mean forming an excessively large hollow in the propeller hub, reducing the mechanical strength of the propeller. Similarly, because the upper sleeve passes through an opening in said support element ensuring a link interface with the motor, a boss on said upper sleeve would mean creating a larger opening in said support element, which could cause mechanical fragility in the link between the upper sleeve and said supporting element. The tubular shape of the sleeves and columns would be an advantage for their incorporation in said cylindrical orifices through said support element and, respectively, the hub of said propeller, providing the best link between the housing and said supporting element and said propeller, whether with respect to mechanical or tightness aspects.

The combination, on the one hand, of the shape of the two half-shells which an be more or less symmetrical because they are assembled on a connecting plane comprising the axes of the two rotating shafts, and may even be absolutely identical, and on the other the material used, contribute to the mass production of a product offering high technical performance and easy assembly implementation under particularly advantageous economic conditions.

By virtue of the structure of the housing, in particular by the fact that the junction of the two half-shells and the closing of the housing are along a plane containing the two axes of rotation of the two shafts, it is possible, on the one hand, to install the complete angle gearbox device in the said hollow zone of one of said half-shells. Therefore, it is possible to check the fitting of the various mechanical components of the angle gearbox device before the assembly of the two half-shells and the closing of the housing. Further, the thrust forces along the longitudinal direction of said axes of rotation of said shafts are spread out and transmitted identically to the two shells and are not taken up exclusive by the attaching means of the two half-shells with one another, but are taken up essentially in the mass of the two shells. More particularly, the choice of a reinforced thermoplastic polymer synthetic material, both injectable through its thermoplastic properties and having properties of high mechanical strength because of its composite nature and the presence of reinforcements, such as mineral or synthetic fillers, makes it possible to obtain, by molding, high precision without the machining of the shells, offering high mechanical performance and perfect uniformity in production.

In a preferential embodiment, the housing according to the invention consists of two identical half-shells.

The identical structure of the two half-shells is an additional advantage because it allows the stocks to be rationalized and contributes to reducing costs in that there is only one part left to be injected. Further, there are no male shells or female shells, meaning that there are no possible errors.

It is advantageous if said bearing surface of each shell includes attaching openings permitting the mechanical assembly of the two half-shells by threaded devices such as screws, in an attaching zone located outside the end zones of said bearing surface forming said upper and side sleeves.

Again advantageously, said half-shells include, in said attaching zone of said bearing surface located below said upper sleeve, either side of the hollow zone receiving said first shaft, hollow cavities permitting the insertion of nuts attaching said housing to said support element to ensure an interconnection interface between the housing and the motor.

The tightness between the two half-shells can be obtained by spreading glue or sealing compound to said bearing surfaces or using an O-ring inserted into a seal groove.

In one advantageous embodiment, each half-shell includes a seal groove in said bearing surface between the receptacle hollow zone and an area comprising the means of attaching the shells together, said seal groove covering more than half the perimeter of the receptacle hollow zone so that said seals of the two shells overlap at an intersection point when the two shells are attached to one another. This overlapping of the seal guarantees complete tightness of the perimeter of the receptacle hollow zone to be protected.

Preferentially, each half-shell has an axis of symmetry corresponding to the axis of said rotating shafts when they are housed inside the receptacle hollow zone, and said seal groove follows the perimeter of one of the symmetrical halves of said shell while protruding from the axis of symmetry in order to open out at least on one end in a hollow part or outside said half-shell. This configuration will allow the creepage of the seal when compressed by junction and attachment of the two half-shells together.

In another alternative embodiment, the housing is constructed from two separate half-shells with, more particularly, a shell having a seal groove on the entirety of its perimeter and a half-shell without a seal groove.

To obtain high mechanical properties, the shells are made of a composite polymer reinforced by mineral or synthetic fillers, in particular in the form of fibers. In a preferred embodiment, the thermoplastic polymer material includes resistance to traction in excess of 200 MPa, preferably higher than 250 MPa and high rigidity with an elasticity modulus exceeding 10 GPa and preferably exceeding 15 GPa and a water absorption capacity of less than 0.5%, and preferably less than 0.15%

In particular, a high performance thermoplastic composite material based on polyphthalamides (PPA) is used, reinforced by glass fiber, preferably to approximately 40% by weight.

Therefore, the advantages of this invention are:
- the properties of watertightness, hydraulic capability of the profile and mechanical strength of the housing, by the taking up of smaller stress forces at the attachment of the two shells and means of assembling the two half-shells comprising collars, and finally, the use of a reinforced thermoplastic polymer material,
- advantageous conditions of production for injection molding by the absence of machining of parts and the total uniformity of the two half-shells, the ease of installation of the angle gearbox device in the housing, which is "open sky", and the possibility of visually inspecting the fitting of said device in the housing and its alignment with respect to the other mechanical parts with which it cooperates outside the housing, in particular the fitting of the various gearwheels and bearings and the perpendicularity of the shafts in the receptacle hollow zone.

This generates a considerable reduction in manufacturing costs, capable of representing up to 30% compared to the total manufacturing cost of a propulsion motor.
- a reduction in the weight of the housing by a factor of 4 to 5 and, thereby, a reduction in the propulsion motor of approximately 20%;
- the absence of galvanic couple in the marine environment, which is one of the drawbacks in using metallic parts,
- and finally, better resistance to corrosion than metallic parts.

Other advantages and characteristics will appear from the reading of the detailed description that follows with reference to the FIGS. 1 and 2.

Figure 1:
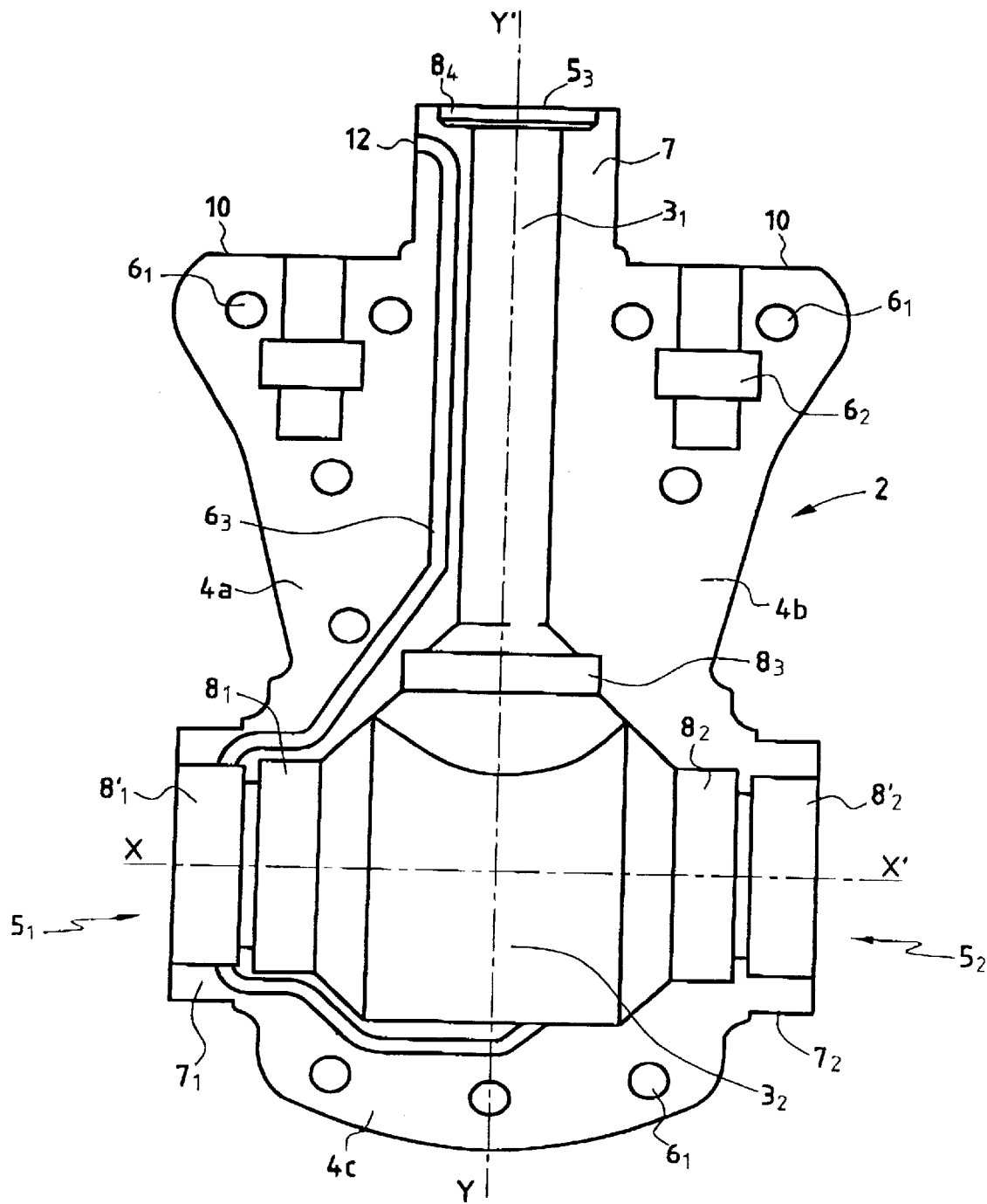
FIG. 1 is a view of the inner face of a half-shell 2 according to the invention.
Figure 3:
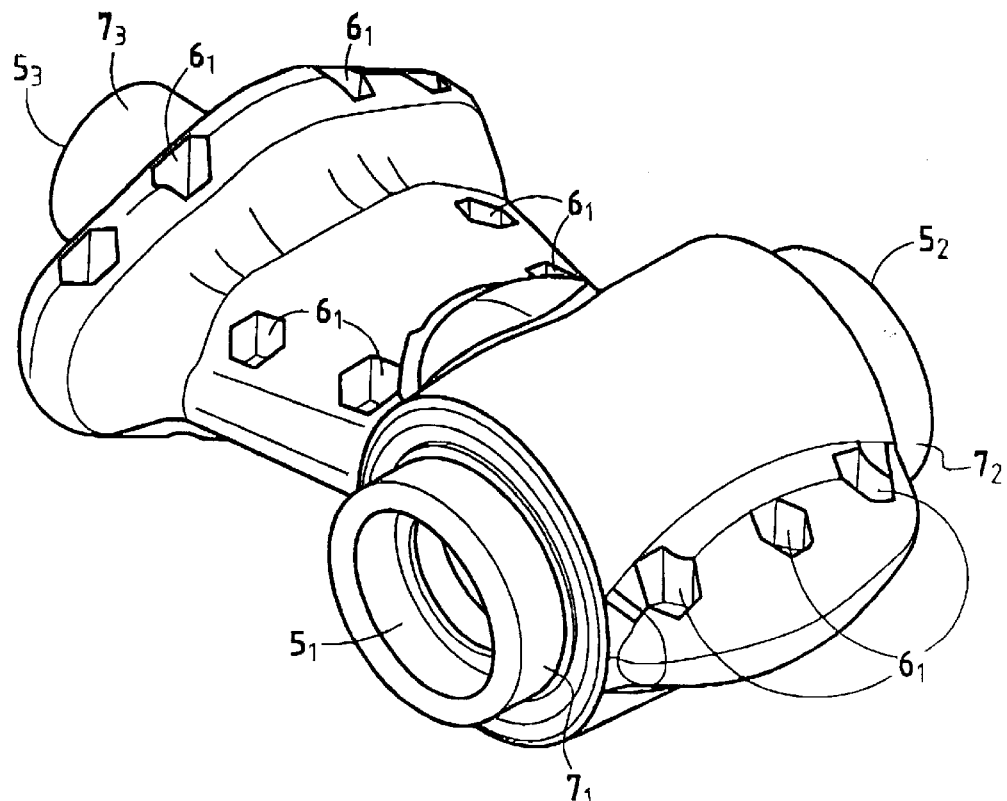
FIG. 3 represents a housing according to the invention seen in perspective.
Figure 2:
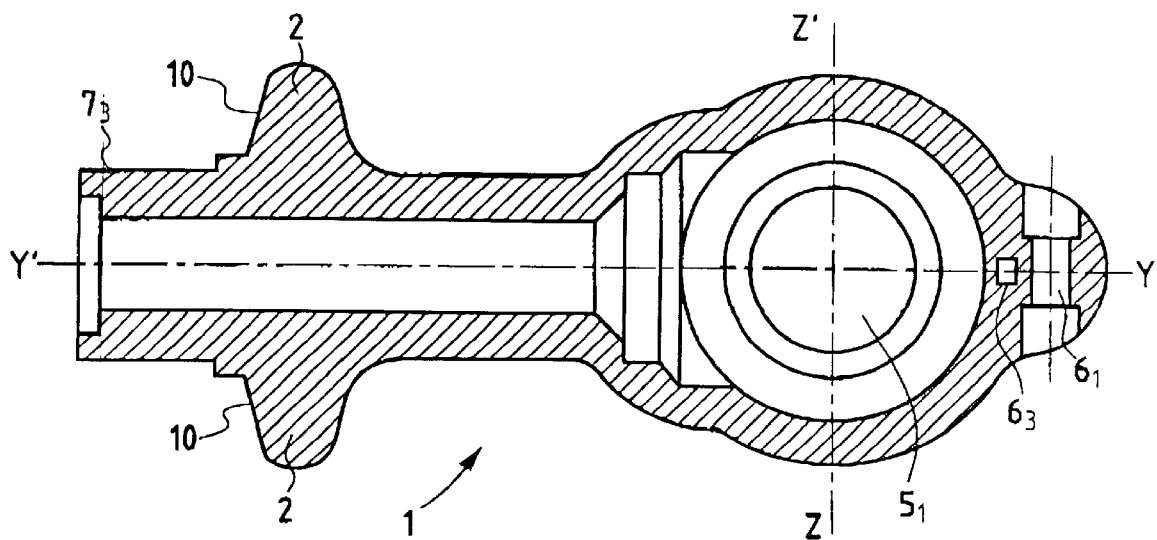
FIG. 2 is a sectional view of a housing 1 profile according to the invention comprising two half-shells 2 assembled in such a way that the two lower faces defined in drawings XX' and YY' of each half-shell bear on each other.

Housing 1 according to the invention as represented and in FIG. 2, obtained by the assembly of two identical half-shells 2 shown in FIG. 1.

In FIG. 1, the lower face of each half-shell has a receptacle hollow zone 3 of the angle gearbox device and a bearing surface $4a$, $4b$, $4c$ which is plane and bears against the same surface of the second shell when the two inner surfaces of the two half-shells are brought into contact for the assembly of the two half-shells and the closing of the housing. Said two bearing surfaces of the half-shells therefore work together according to said junction plane of the two shells defined by said axes of rotation of said rotating shafts.

The two half-shells 2 include at their ends, semi-tubular shape half-sleeves $7_3$, $7_2$, $7_1$ in such a way that when the half-shells are assembled together, they define:

- an upper sleeve $7_3$, tubular in shape, whose upper end defines upper orifice $5_3$ of said housing through which said first shaft penetrates, and
- two side sleeves $7_1$, $7_2$, comprising annular internal openings $8_3$, $8_2$, designed to receive said bearings. The end of at least one side sleeve defines a side orifice $5_1$, $5_2$ for said housing, through which penetrates at least a said second shaft.

In one embodiment, the propulsion motor includes a single propeller, and a side orifice $5_2$ of said housing is blanked In another embodiment, the propulsion motor includes two propellers and each side orifice $5_1$, $5_2$ of said housing is transversed by a said second shaft.

Stable and tight means of assembly of two half-shells comprising stainless steel collars $9_1$, $9_2$, $9_3$, tubular in shape and adjusted forcibly about said tubular sleeves $7_1$, $7_2$, $7_3$.

Said upper tubular sleeve $7_3$ protrudes with respect to an upper bearing surface 10 of the housing designed to cooperate with a surface of a supporting element (not shown) ensuring an interconnecting interface between the housing and the motor. Said support element includes a cylinder opening through which said upper sleeve $7_5$ passes, fitted with said upper collar $9_3$. Said supporting element can be placed inside or outside the hull of the boat according to the applications. In the case of bow propulsion motors, the supporting element can be placed advantageously inside the hull so that the hull is interposed between upper bearing surface 10 of the housing and said supporting element.

At least one of side sleeves $7_1$, $7_2$, provided with side tubular collars $9_1$, and $9_2$ can cooperate with a cylindrical orifice in a propeller hub.

The receptacle hollow zone 3 of each shell is hollowed in such a way as to protect half the angle gearbox device. In particular, the part having a semi-circular section $3_1$ corresponds to the envelope of half-cylinder.

Figure 4:
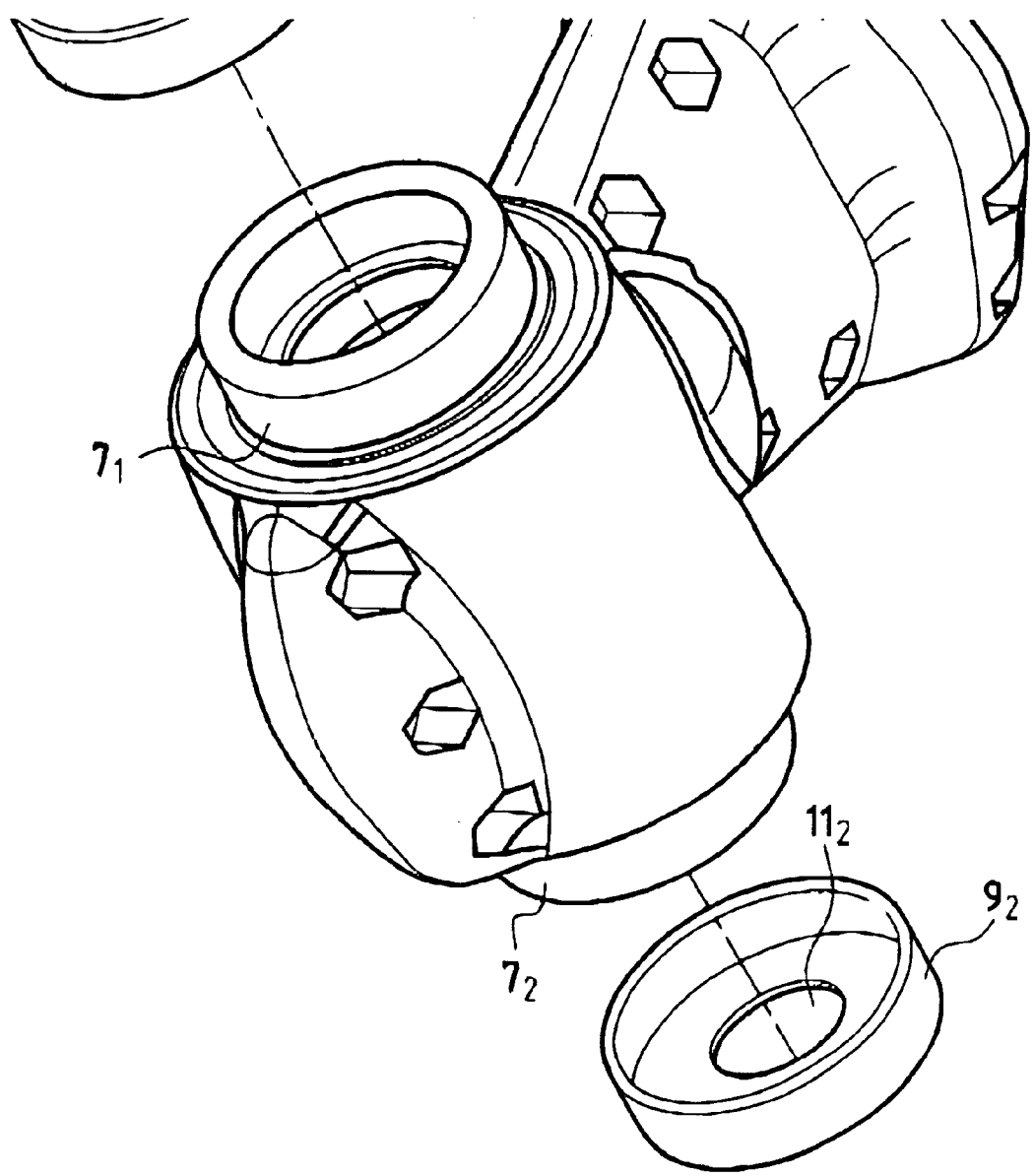
FIG. 4 represents a housing according to the invention seen in perspective with assembly collars shown in the cleared position compared to the sleeve in which they are to be adjusted.

FIG. 4 shows the receptacle hollow zone 3 of the angle gearbox device comprising several parts:
- upper part $3_1$, having a vertical semi-cylindrical shape, i.e., having a semi-circular section receiving the first rotating shaft connected to the motor by its upper end and opening out into upper orifice $5_3$ of the housing,
- a lower part $3_2$ receiving:
  - the lower end of said first shaft,
  - the toothed gearwheels and ball-bearings, as well as
  - the end of said second rotating shaft driven in rotation by said gears and ball-bearings, and whose other end opens out into side orifice $5_1$, $5_2$ of the housing.

Said lower part $3_2$ of said hollow area includes:
- an annular opening $8_3$ in the upper part designed to receive said bearing of said first shaft, and
- annular openings $8_1$, $8_2$ designed to receive the bearings of said shaft and annular openings $8'_1$, and $8'_2$ designed to receive annular seals at the side ends.

Accordingly, in FIG. 4, to improve tightness:
- side sleeves $7_1$, $7_2$ include annular openings $8'_1$, and $8'_2$ designed to receive double-lip seals formed was washers placed about said second shaft toward the outside of the housing compared to openings $8_1$, $8_2$, intended for the bearings; and
- side collars $9_1$, and $9_2$, tubular in shape, including at their end a bottom with a central circular opening $11_1$, $11_2$ having a diameter corresponding approximately to the diameter of said second rotating shaft in such a way that said seals inserted into the annular openings $8'_1$, and $8'_2$ are protected by the solid zone of said bottom, said side collars $9_1$, $9_2$ thus forming protection caps with respect to said seals.

In the present instance, "double-slip seals" indicates that the washer has circular lips on each of the inner and outer surfaces. The lip therefore provides tightness with respect to the outside pressure and the inside pressure, on the one hand, between the seal and the rotating shaft, and on the other between the seal and the inside surface of the housing. Therefore, the cap provides mechanical protection of the outer lip of said seal.

If the propulsion motor has a single propeller, a said orifice $5_2$ will be blanked. In this case, corresponding collar $9_2$ will have a totally closed base and not include a central opening $11_2$, and thus form a cap. It the propulsion motor has a second propeller, a shaft supporting said second propeller will open out inside opening $5_2$ located opposite, and the two side collars $9_1$, and $9_2$ will include circular openings $11_1$, and $11_2$, as shown in FIG. 4.

When upper sleeve $7_3$ is not in an immersed area in the application concerned, upper sleeve $7_3$ can be reduced even more in diameter, if it does not include a bearing and seals and if the latter are housed inside collar $9_3$ and above said sleeve $7_3$. Said upper collar $9_3$ forms a protection bush with respect to a seal, preferably of a double-lip side shape as a washer (not shown) and a bearing (not shown) superimposed on said shaft within said upper collar $9_3$ above said upper sleeve $7_3$. In this case, opening $8_4$ shown in FIG. 4 avoids any contact between the balls of the ball-bearing and the sleeve.

Within the zone corresponding to bearing surface 4, the following are provided for in an attaching area:

a/ assembly orifices $6_1$ for the two shells to be assembled together. These assembly orifices $6_1$ allow the two shells to be attached by means of a threaded device such as screws and nuts, more particularly of stainless steel, b/ hollow areas $6_2$ for attaching the housing to a supporting element ensuring an interconnecting interface between the housing and the motor and working together with upper sleeve $7_3$ and said outer bearing surface 10 of the housing. Before closing the housing, in said hollow attaching zone of housing $6_2$, a nut is placed which remains captive after the housing is closed and that can cooperate with a screw inserted through said interconnecting interface supporting element with the motor.

Said attaching zone of bearing surface 4 consists of three parts:

two symmetrical side parts 4a and 4b and closing hollow zone $3_1$ forming the receptacle for said first part, located between upper half-sleeve $7_3$ and the side half-sleeves $7_1$ and $7_2$, and a hollow part 4e which connects the lower edges of the two half-shells located below said hollow area $3_2$, the gear receptacle, and therefore located below annular openings $8'_1$ and $8_1$ and $8'_2$, $8_2$ in the two side half-sleeves $7_1$ $7_2$.

The two half-shells 2 are symmetrical with respect to axis YY' of the tubular section shape $3_1$. Seal groove $6_3$ encloses receptacle hollow zone 3 of the angle gearbox device, while forming a bearing surface 4 between:

on the one hand, the inside edge of bearing surface 4, which demarcates it compared to said receptacle hollow zone 3, and on the other hand, said attaching zone of bearing surface 4 comprising assembly orifices $6_1$ and attaching orifices $6_2$.

To ensure a perfect seal, seal grove $6_3$ runs around the entire border of hollow zone $3_1$ in symmetrical side part 4a of the bearing surface and only slightly more than half the lower edge of hollow zone $3_2$, in lower part 4c of the bearing surface so that the two seals $6_3$ overlap when the two half-shells are assembled. Lip groove $6_3$ is therefore made in only one of symmetrical side parts 4a of the bearing surface.

Seal $6_3$ is placed near the edge of hollow zone 3, and each seal section opens out at least at one end in hollow part $3_2$, or on the outside 12 of the shell in such a way that the seal may always creep when compressed by the assembly of the two shells.

The tightness obtained with the various seals in place provides protection against the extended effects of immersion under pressure and corresponds to a liquid protection index (PI) of 8. They also provide total protection against dust corresponding to a protection index against solids (PI) of 6.

Each half-shell includes a hollow zone 3 supporting the entirety of the angle gearbox device so that the installation and adjustment of the latter in "open sky" mode can be checked visually or by means of metrological test equipment, in particular concerning the adjustment of the perpendicularity of the shaft and their positioning in line with the various hollow parts of the receptacle housing of said shafts, considerably facilitating these operations.

The bearings housed in the annular receptacles 81, 82, and 83 make it easier to fit the two half-shells on one another. The bearings are in fact used as assembly-centering devices before said collars are forcefully fitted over said sleeves.

As an illustration, it is pointed out that the fitting tolerances of an angle drive gear box is approximately $5/100$ millimeter for a shell whose overall outside dimensions are on the order of one hundred mm and whose lower diameters of the hollow areas are included between 10 and 30 mm. And The shell according to the up is obtained by the injection molding of a high mechanical performance thermoplastic composite material, polyphamide (PPA) reinforced with glass fiber in the proportion of 45% by weight. More particularly, this is a polyphamide of the AMODEL® brand (manufactured by RHONE-POULENC ref. AS1145) having high mechanical properties in terms of rigidity with an elasticity modulus in excess of 15 GPa and high tensile strength with a tensile breaking strength in excess of 250 MPa whereas the two properties of rigidity and tensile strength are generally incompatible: normally, a high rigidity material is fragile and vice versa.

What is claimed is:

1. A boat propulsion motor angle gearbox device housing (1) designed to be immersed and contain an angle gear box device comprising:

two rotating shafts with respect to two perpendicular axes (X, Y', Y, Y') of which the first shaft (YY') is driven in rotation by said motor and a second shaft (XX') driving at least one propeller in rotation, as well as mechanical components including gears and ball bearings for transmitting the rotation of said first shaft to said second shaft, characterized in that it includes two complementary half-shells assembled together and consisting of a reinforced thermo-plastic polymer synthetic material co-operating according to a junction plane defined by said axes of rotation (XX', YY') of said rotating shafts and each presenting in said junction plane:

a hollow receptacle area of said angle gearbox device and a plane bearing surface outside said hollow receptacle area and serving as a support on the complementary half shell.

2. A housing according to claim 1, characterized in that:

the two half shells include at their ends half-sleeves so that once the half-shells are assembled together, they define said housing presenting:

an upper tubular sleeve through which said first shaft penetrates, and at least one side tubular sleeve comprising at least one internal annular recess designed to accommodate a said bearing, said side sleeve through which a said second shaft penetrates, and stable and sealed means of assembling the two half shells including collars tubular in shape, fitted to said tubular sleeves.

3. A housing according to claim 2, characterized in that:

the side sleeves comprising annular hollows designed to receive double lip seals in the form of washers placed around said second shaft toward the outside of the housing with respect to the hollows intended for the bearings; and the side collars, tubular in shape, comprising at one end a bottom with a central circular opening the diameter of which corresponds approximately to the diameter of said second rotating shaft so that said seals inserted in the annular hollows, are protected by the solid area of said bottom, said side collars forming protection caps with respect to said seals.

4. A housing according to claim 2, characterized in that it includes two side tubular sleeves, a second shaft opening out through at least one of said side sleeves.

5. An angle gear box device according to claim 1, characterized in that it comprises two identical half shells.

6. A housing according to claim 1, characterized in that said bearing surface of each half-shell includes attaching openings permitting the mechanical assembly of the two half-shells by threaded devices in an attaching area located away from the ends zones of said bearing surface forming said upper sleeves and side sleeves.

7. A housing according to claim 6, characterized in that said half-shells comprising in said attaching area of said bearing surface located below said upper sleeve either side of hollow area receiving said first shaft, hollow cavities permitting the insertion of nuts for attaching said housing to said support part providing an interconnecting interface between the housing and the motor.

8. An angle gearbox device housing according to claim 6, characterized in that each half shell includes a seal groove located in said bearing surface between said receptacle hollow area and said attaching area comprising an attaching means of the half-shells together said seal groove covering more than half the perimeter of said hollow area so that said seals of the two half shells overlap at a point of intersection when the two shells are attached to one another.

9. An angle gearbox device housing according to claim 8, characterized in that each half shell has an axis of symmetry corresponding to the axis of one of said rotating shafts (YY') when they are housed inside the hollow area, and said seal groove follows the perimeter of said hollow area in that one of the symmetrical halves of said shell while protruding from the axis of symmetry (YY') in such a way as to open out at least at one end into one of a hollow part ($3_2$) and on the outside of said shell.

10. A housing according to claim 1, characterized in that said half shell is made of a thermo plastic polymer material which offers tensile strength in excess of 200 MPa, and high rigidity with an elasticity modulus in excess of 10 GPa, and having a water absorption capacity of <0.5%.

11. A housing according to claim 1, characterized in that said half shell is made of a composite polymer material reinforced by one of mineral of fillers and synthetic fillers.

12. A housing according to claim 11, wherein said one of mineral fillers and synthetic fillers comprises fibers.

13. A housing according to claim 1, characterized in that said half-shell is made of a polyphthalamide polymer comprising approximately 45% glass fiber.

* * * * *